United States Patent [19]

Gould et al.

[11] Patent Number: 4,842,791
[45] Date of Patent: Jun. 27, 1989

[54] EXTRUSION APPARATUS AND PROCESS FOR PRODUCTION OF MULTILAYER FILM CONTAINING AN INNER BARRIER LAYER

[75] Inventors: Gordon E. Gould; Robert A. Luecke, both of Newark, Ohio

[73] Assignee: The Dow Chemical Company, Midland, Mich.

[21] Appl. No.: 67,847

[22] Filed: Jun. 30, 1987

[51] Int. Cl.⁴ .............................................. B29C 47/06
[52] U.S. Cl. ................................ 264/171; 425/131.1; 425/133.5
[58] Field of Search ...................... 264/171, 169, 173; 425/131.1, 133.5, 96, 107, 133.1

[56] References Cited

U.S. PATENT DOCUMENTS

| | | | |
|---|---|---|---|
| 3,315,306 | 4/1967 | Ladner et al. | 425/133.5 |
| 3,477,099 | 11/1969 | Lee et al. | |
| 3,511,903 | 5/1970 | Glass et al. | 264/173 |
| 3,528,130 | 9/1970 | Lefevre et al. | 425/131.1 |
| 3,743,459 | 7/1973 | Schrenk et al. | 425/133.5 |
| 4,410,602 | 10/1983 | Komoda et al. | |
| 4,611,987 | 9/1986 | Hahn et al. | 425/131.1 |
| 4,629,650 | 12/1986 | Kataoka | 425/96 |

FOREIGN PATENT DOCUMENTS

| | | | |
|---|---|---|---|
| 51-10863 | 1/1976 | Japan | 425/133.5 |
| 58-5225 | 1/1983 | Japan | 264/169 |
| 60-101021 | 6/1985 | Japan | 264/169 |

OTHER PUBLICATIONS

Research Disclosure No. 26718, Jul. 1986, "Early Encapsulation for Improved Protection of Thermally Degradable Resins in Coextruded Structures".

Primary Examiner—Jeffery Thurlow

[57] ABSTRACT

A process and apparatus are disclosed for reducing the carbonization of a thermally degradable barrier material during the extrusion of a multilayer laminate. A core extrudate of barrier material is extruded with a core extruder. A preencapsulation means is provided adjacent the downstream end of the core extruder. The core extrudate is joined with a preencapsular extrudate in the preencapsulation means in a coaxial relation wherein the preencapsular extrudate is disposed radially outwardly of the core extrudate. The preencapsulated core extrudate is then directed to a feed block and coextrusion die for incorporation in the coextruded multilayer film.

18 Claims, 2 Drawing Sheets

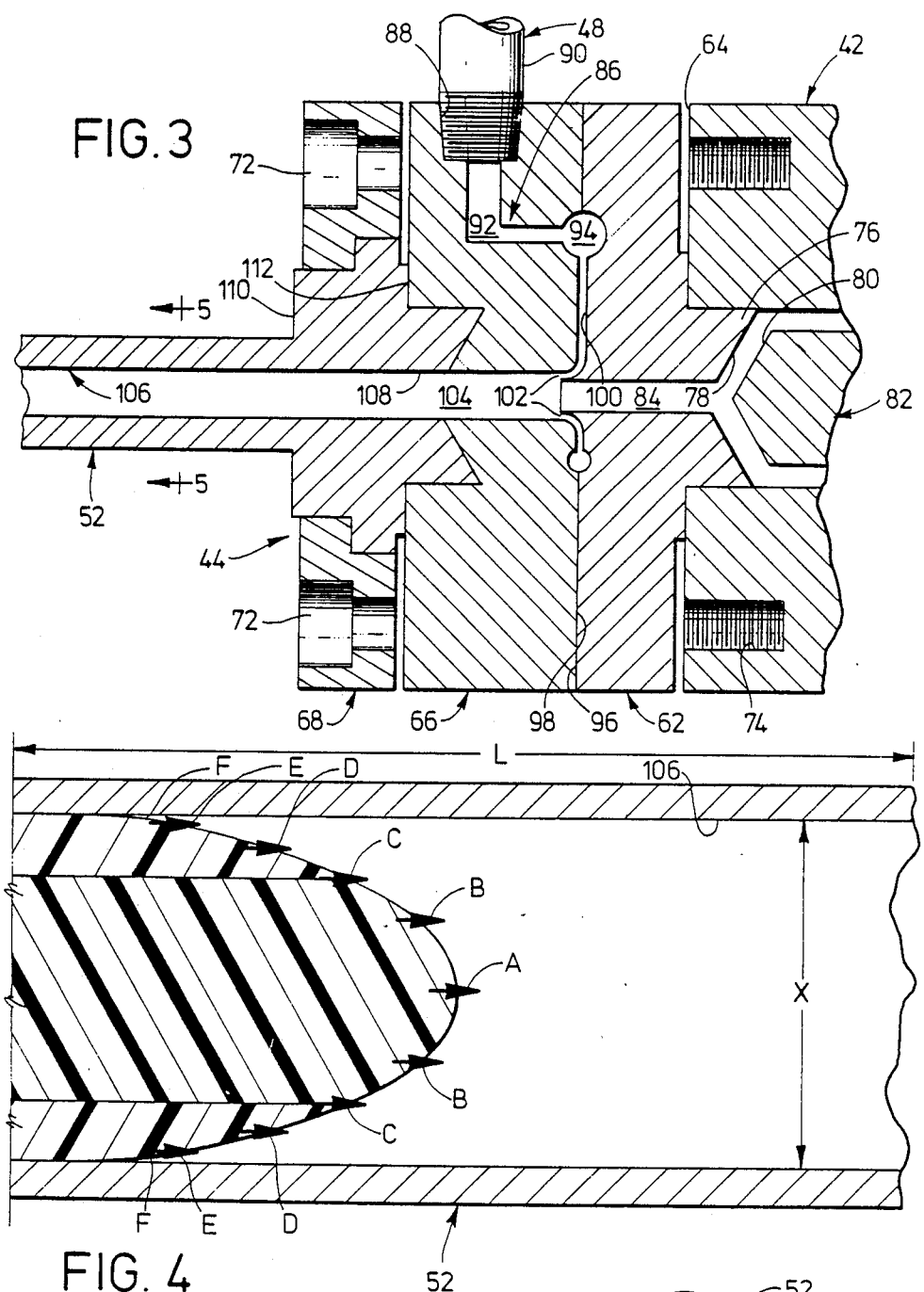
FIG. 3
FIG. 4
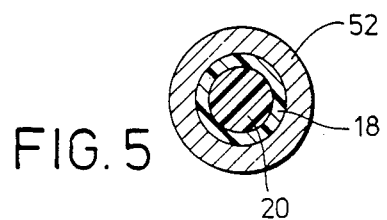
FIG. 5

EXTRUSION APPARATUS AND PROCESS FOR PRODUCTION OF MULTILAYER FILM CONTAINING AN INNER BARRIER LAYER

BACKGROUND OF THE INVENTION

The present invention relates to a method and apparatus for extruding a multilayer film, and more particularly to a method for preventing the thermal degradation of the barrier layer component of a multilayer film.

In the manufacture of film materials, it is often desirable to utilize a multilayer film rather than a single layer one. By using a multilayer film, one can combine the properties of different types of materials to form a film having the qualities desired for the end use to which the film is placed.

For example, it is common practice to employ a barrier material, such as a Saran vinylidene chloride-vinyl chloride copolymer, as an inner layer in a multilayer film in order to provide gas and moisture vapor barrier characteristics to the film. Such barrier layer containing multilayer films often have polyolefin outer layers. Arrangements of this type are illustrated by Lee et al U.S. Pat. No. 3,477,099, which is assigned to the same assignee as the instant invention, Komoda et al U.S. Pat. No. 4,410,602, and others.

As disclosed in Lee et al, a problem which exists in forming such multilayer films is that Saran barrier materials, which are halogenated resins, are difficult to extrude because of their corrosive nature. For that reason Lee et al discloses a system for encapsulating an extruded corrosive barrier material in a stream of non-corrosive material and subsequently shaping the stream into a film. The non-corrosive material may be a glue layer, such as an ethylene vinyl acetate, which not only serves to prevent the corrosive barrier material from contacting the surface of the extrusion die, but also helps bond the barrier layer to the outer layers in the resulting multilayer film.

While the system of Lee et al is a definite improvement in production of multilayer film containing a Saran barrier layer, problems still exist in that regard. Some of these problems result from the thermally degradable nature of Saran barrier materials. As a result of their thermal degradability, Sarans have a tendency to "carbonize" in the extrusion apparatus.

Carbonization results in the formation of small carbon particles in the molten extrudate. These carbon particles can result in a carbon build-up in the transfer tube leading from the barrier material extruder to the feed block where various components of the multilayer film are joined together. This carbon build-up in the transfer tube effectively reduces the inside diameter of the transfer tube, thereby creating an undesirable pressure drop and also serving as a source of contamination of the polymer.

Additionally, this carbonization can result in a carbon build-up in the adaptor portion of the feed block where the various polymer streams are joined together prior to extrusion by the coextrusion die. This carbon build-up in the feed block changes the shape of the multilayer film, which in turn creates variations in the thickness of the barrier layer. These variations in the thickness of the barrier layer are undesirable because of their deleterious impact on the physical properties of the film. Finally, this carbon build-up typically requires the manufacturer to shut down and clean the extrusion apparatus about every two weeks. This shut down and cleaning of the extrusion apparatus results in high maintenance costs and lost production time.

It would be desirable, therefore, to overcome the problems discussed above by providing a process and apparatus for extruding a multilayer film wherein the likelihood of carbonization is reduced.

SUMMARY OF THE INVENTION

The present invention meets that need by providing a method and apparatus for reducing carbonization of the barrier material in a coextrusion process. In the method of the present invention, a core extrudate of barrier material is extruded with a core extruder. A preencapsulation means is provided adjacent the outlet of the core extruder. A preencapsular extrudate is extruded by the preencapsulation means in a coaxial relationship to the core extrudate so that the preencapsular extrudate is disposed radially outwardly of the core extrudate to surround or encapsulate the core extrudate. The preencapsulated core extrudate is then directed through a transfer tube to a film forming system of the type disclosed in Lee et al U.S. Pat. No. 3,477,099, the disclosure of which is hereby incorporated by reference.

Preferably, the preencapsular extrudate is extruded in an amount sufficient so that the preencapsular extrudate will prevent any substantial contact between the core extrudate and the inner wall of the transfer tube. Also, a sufficient amount of preencapsular extrudate should be extruded to ensure that the residence time of the core extrudate in the transfer tube is less than the amount of time required to cause carbonization of the core extrudate.

Also in accordance with the present invention, an extrusion apparatus is provided for coextruding a multilayer film from a plurality of feed stock materials. The extrusion apparatus comprises a core extruder for extruding a core extrudate of barrier material. A preencapsulation means is provided adjacent the outlet of the core extruder. A transfer tube is used to transfer the preencapsulated core extrudate to a feed block and coextrusion die.

One feature of the present invention is that in the transfer tube, the preencapsular material is caused to flow adjacent to the walls of the transfer tube, and the core material is caused to flow through the center of the tube, and away from the walls of the tube. By maintaining the flow of core material near the center of the tube and away from the walls, the residence time of the core material in the transfer tube, and hence the entire extrusion apparatus, is reduced substantially. Not only is the average residence time of the core material in the transfer tube substantially less than the average residence time of the combined material in the transfer tube, but even the residence time of the slowest moving fraction of the core material in the transfer tube and feed block is less than the residence time typically required to cause carbonization of the thermally degradable barrier material.

It is also a feature of the present invention that the preencapsular layer is used in conjunction with a separately extruded encapsulation or "glue" layer to form a dual preencapsulation/encapsulation layer arrangement between the outer layers of the multilayer film and the core of the multilayer film. This dual preencapsulation/encapsulation layer arrangement has the advantage of permitting a less expensive material to be used as the primary encapsulation or glue layer, while still achieving satisfactory adhesive results. For example, as the preencapsulation layer is used in relatively small quantities, a relatively expensive material can be used for the preencapsular extrudate to achieve the proper adhesive qualities, and a relatively less expensive material can be used for the larger volume primary encapsulation or glue layer.

Additional features and advantages of the present invention will become apparent to those skilled in the art upon consideration of the following detailed description of a preferred embodiment exemplifying the best mode of carrying out the invention as perceived presently.

BRIEF DESCRIPTION OF THE DRAWINGS

FIG. 3 is an enlarged, sectional view taken along line 3—3 of FIG. 1 of the preecapsulation means of the present invention;

FIG. 4 is an enlarged, schematic view of the transfer tube of the present invention; and FIG. 5 is a sectional view taken along lines 5—5 of FIG. 3.

DETAILED DESCRIPTION OF THE PREFERRED EMBODIMENT

Figure 1:
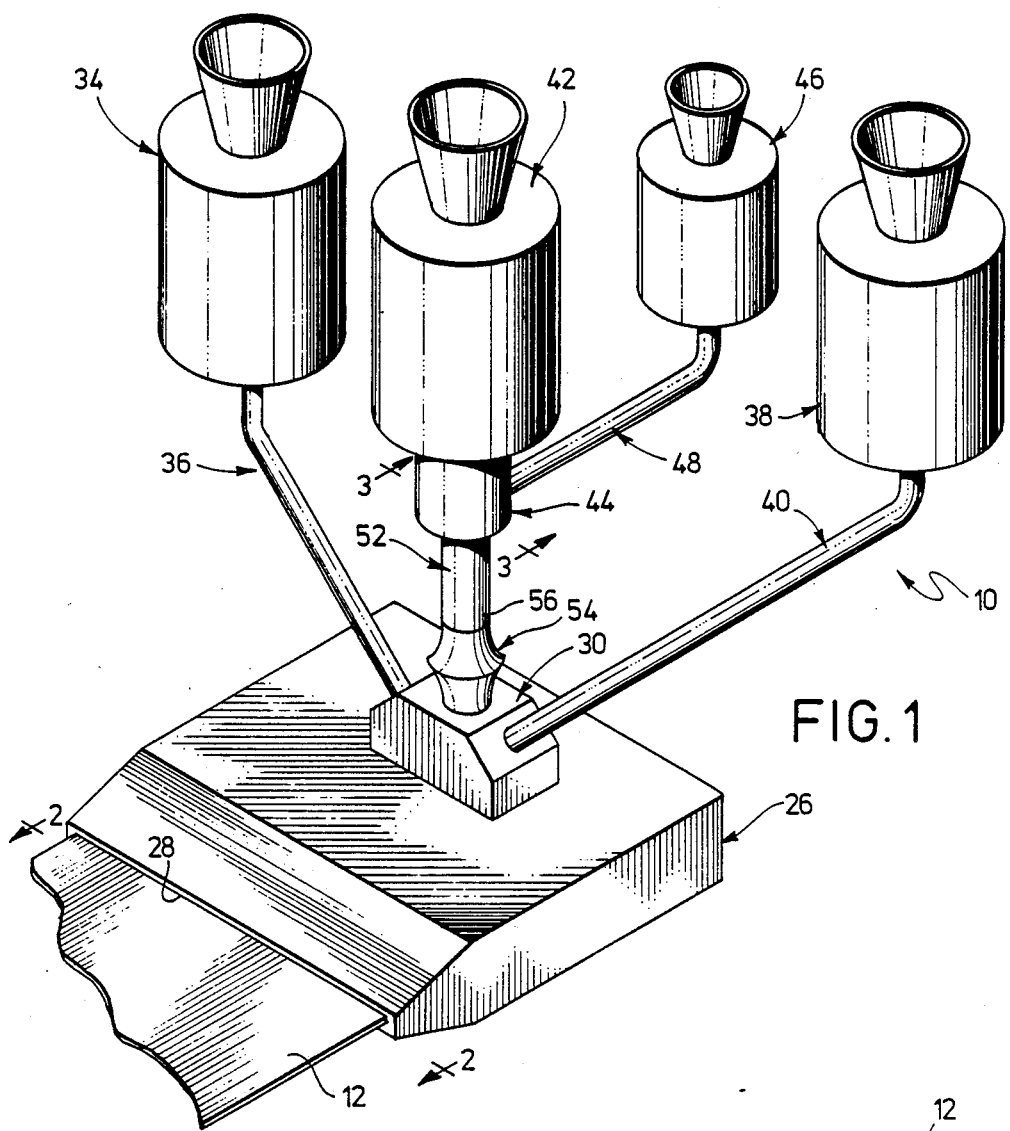
FIG. 1 is a perspective view of the extrusion apparatus of the present invention.

An extrusion apparatus 10 is shown in FIG. 1 for extruding a multilayer film 12 which includes a plurality of component layers, and is formed from a plurality of feed stock materials. The multilayer film 12 (FIG. 2) includes an outer layer 14, which forms the top surface 14', bottom surface 14" and side surfaces 14''' of the multilayer film 12. Preferably, the outer layer 14 is composed of a polyolefin material such as polyethylene. A glue layer 16, having surface 16' adjacent to and interiorly of top surface 14' of the outer layer and surface 16" adjacent to and interiorly of the bottom surface 14" of the outer layer is preferably comprised of an ethylene vinyl acetate copolymer. A preencapsulation layer 18 is disposed interiorly of glue layer 16, and completely encapsulates the core layer 20. Preencapsulation layer 18 is also preferably composed of an ethylene vinyl acetate copolymer.

Glue layer 16, and preencapsulation layer 18 may be composed of the same material, different materials, or different blends of the same material, such as different blends of an ethylene vinyl acetate copolymer. For example, the applicants have found that a savings in material cost can be achieved by using an ethylene vinyl acetate copolymer blend for the preencapsulation layer which is different than the ethylene vinyl acetate copolymer blend used for the glue layer. These cost savings are achieved in the following manner. The cost of an ethylene vinyl acetate copolymer is generally proportional to the percentage of vinyl acetate in the copolymer. Thus, a copolymer having a high percentage of vinyl acetate is generally more expensive than a copolymer having a low percentage of vinyl acetate. However, in order to form a good bond with the Saran barrier material which preferably comprises core layer 20, an ethylene vinyl acetate copolymer having a relatively high percentage of vinyl acetate is required. Conversely, an ethylene vinyl acetate copolymer having a relatively low percentage of vinyl acetate can be utilized to create a secure bond to the polyolefin outer layer 14. Thus, by using an ethylene vinyl acetate copolymer having a relatively high percentage of vinyl acetate (typically greater than 14 percent vinyl acetate) for the preencapsulation layer 18, a secure bond can be formed with the Saran core layer 20. By using an ethylene vinyl acetate copolymer having a relatively lower vinyl acetate percentage (such as between about 8 and 14 percent vinyl acetate) for glue layer 16, a good bond can be formed with the polyolefin outer layer 14, while achieving a substantial cost savings through the use of a relatively lower cost ethylene vinyl acetate for glue layer 16.

As mentioned, the core layer 20 is preferably composed of Saran vinylidene chloride-vinyl chloride copolymer. As discussed above, a Saran material is useful in the construction of a multilayer film because of the relatively gas impermeable and moisture impermeable nature of the Saran. However, as also mentioned Sarans and other halogenated resins are thermally degradable. The present process offers advantages anytime the multilayer film is to include a thermally unstable core material, such as Saran resin, or other halogented resin barrier materials, other polyvinylidene chloride polymers or copolymers, polyvinyl chloride polymers or copolymers, polyacrylonitrile, etc. For a more complete discussion of the materials which can be used for outer layer 14, intermediate glue layer 16, and core layer 20, see Lee, Jr., et al U.S. Pat. No. 3,477,099.

As will be appreciated, the relative thicknesses of the outer layer 14, glue layer 16, preencapsulation layer 18 and core layer 20 can be varied depending upon the particular application to which the multilayer film 12 is placed. In one film made by the applicants, each of top surface 14' and bottom surface 14" of outer layer 14 were approximately 0.000625 inches thick; each of the top and bottom surfaces 16', 16" of glue layer 16 were 0.000214 inches thick; each of the top, bottom and side surfaces preencapsulation layer 18 was 0.000036 inches thick; and the core layer 20 was approximately 0.00025 inches thick. As polyethylene is the least expensive component of the film, thicker films are generally made by increasing the thickness of outer layer 14.

Referring back to FIG. 1, the extrusion apparatus 10 includes a coextrusion die 26 having a die slot 28 through which the multilayer film 12 is extruded. A feed block 30 is disposed upstream and adjacent to the coextrusion die 26. The feed block 30 feeds the various extrudates to the coextrusion die 26, and joins the various extrudates from which the multilayer film 12 is made in a proper relation so that the components will be placed in their proper relative positon for extrusion through coextrusion die 26.

An outer layer extruder 34 is provided for extruding an outer layer extrudate which will ultimately become outer layer 14 in the multilayer film 12. A transfer means 36 extends between the outer layer extruder 34 and the feed block 30.

A glue extruder 38 is provided for extruding a glue extrudate which will ultimately become glue layer 16, in the finished multilayer film 12. A transfer tube 40 extends between the glue extruder 38 and the feed block 30.

A core extruder 42 is provided for extruding a core extrudate which will ultimately become core layer 20 of the multilayer film 12. A preencapsulation means 44 is provided adjacent the outlet of the core extruder 42, and receives the core extrudate extruded by the core extruder 42 immediately after its extrusion. A preencapsular extruder 46 is provided for extruding an preencapsular extrudate which will ultimately become preencapsulation layer 18 of the finished multilayer film 12. A transfer means 48 is provided for transferring the freshly extruded preencapsular extrudate to the preencapsulation means 44. In the preencapsulation means 44, the preencapsular extrudate is joined to the core extrudate in a nonmixing, encapsulating relation, so that when the preencapsulated core extrudate is delivered to, and flows in transfer tube 52, the preencapsular material and core material will be disposed in a coaxial relation with the preencapsular material disposed radially outwardly of the core material.

Transfer tube 52 is disposed downstream of the preencapsulation means 44, and is provided for transferring the preencapsulated core extrudate to feed block 30. A filter 54 can be interposed between the downstream end 56 of transfer tube 52, and feed block 30 for filtering out any particulate matter flowing in transfer tube 52 before the preencapsulated core extrudate reaches the feed block 30.

The preencapsulation means 44 is shown in more detail in FIG. 3 as including an axially arrayed series of members which define a series of pathways in the preencapsultion means 44 for directing the flow of core extrudate and preencapsular extrudate therein. The preencapsulation means 44 includes an inner member 62 disposed adjacent to the downstream end 64 of core extruder 42, a middle member 66 disposed axially outwardly from the inner member 62, and an outer member 68 disposed axially outwardly from the middle member 66. The inner middle and outer members 62, 66, 68 are placed in an end to end, colinear relation, and are disposed between the downstream end of 64 of the core extruder 42 and the upstream end of transfer tube 52. The inner, middle and outer members 62, 66, 68 are mounted to the core extruder by bolts 72 which pass through aligned openings in the inner, middle and outer members 62, 66, 68. The bolts 72 are threadedly engaged in axially outwardly opening apertures 74 in the core extruder 42.

Inner member 62 is generally disk shaped, and includes an axially extending leg 76 having a conically shaped axially inner end 78. The conically shaped axially inner end 78 is disposed in a spaced, parallel relation to the downstream end 80 of the extrusion advancing screw 82 of the core extruder 42. Inner member 62 also includes an axially extending central pathway 84. The downstream end 80 of the extrusion advancing screw 82, and the conical axial end 78, and central pathway 84 of the inner member 62 so as to define a core extrudate pathway through which the core extrudate flows immediately after its extrusion by the core extruder 42.

Likewise inner member 62 and middle member 66 cooperate to define a preencapsular extrudate pathway 86 in the preencapsulation means 44 for directing preencapsular extrudate to the stream of core extrudate flowing through the central pathway 84. The preencapsular extrudate pathway 86 includes an inlet portion 88 for receiving the downstream end 90 of the preencapsular extrudate transfer means 48, and thus for receiving the preencapsular extrudate flowing therein. The preencapsular extrudate pathway 86 also includes an L-shaped (in cross section) portion 92 (in cross-section) having a radially inwardly extending leg and an axially inwardly extending leg. The L-shaped portion 92 is disposed downstream from the inlet portion 88 for receiving preencapsular extrudate from the inlet portion 88 and for directing the preencapsular extrudate to a spiralling raceway 94 formed between the axially outer surface 96 of inner member 62, and the axially inner surface 98 of middle member 66. The preencapsular extrudate pathway 86 also includes a radially inwardly extending portion 100 which extends between the raceway 94 and the outlet portion 102 of the preencapsular extrudate pathway 86. The outlet portion 102 circumferentially surrounds the downstream end of the central pathway 84, and extends generally axially to direct the flow of the preencapsular extrudate in and axial direction, so that the preencapsular extrudate flowing out of the outlet portion 102 joins the core extrudate flowing out of the central pathway 84 in a coaxial, surrounding relation in the preencapsulated core extrudate pathway 104.

The preencapsulated core extrudate pathway 104 is disposed colinearly with the central pathway 84 and has a cross-sectional area generally equal to the combined cross-sectional areas of the outlet portion 102 of the preencapsular extrudate pathway 86, and the central pathway 84, so that the flows of core and preencapsular material are not substantially restricted in preencapsulated core extrudate pathway 104. For example, in one embodiment of the instant invention, the cross-sectional area of the central pathway 84 is approximately 0.077 square inches, the cross-sectional area of the outlet 102 of the preencapsular extrudate pathway 86 is approximately 0.034 square inches, and the cross-sectional area of the preencapsulated core extrudate pathway 104 is approximately 0.11 square inches.

Transfer tube 52 includes and interior passageway 106 having an upstream end 108. The upstream end 108 of the interior passageway 106 of transfer tube 52 is disposed colinearly with, and has generally the same cross-sectional area as the preencapsulated core extrudate pathway 104 so as not to induce perturbations in the flow of the preencapsulated core extrudate as it moves from pathway 104 into the interior passageway 106. A collar 110 is formed at, or fixed to the upstream end of transfer tube 52. The collar 110 is mateable with the axially outwardly facing surface 112 of middle member 66, for properly positioning transfer tube 52 on the preencapsulation means 44. The ring-shaped outer member 68 of the preencapsulation means 44 serves as a yoke for maintaining the collar 110 on the preencapsulation means.

The flow of core material and preencapsular material through the interior passageway 106 of the transfer tube 52 is shown in FIG. 5. The flow of core and preencapsular material is generally coaxial with the preencapsular material being disposed radially outwardly of the core material. The stream of preencapsular material surrounds the stream of core material to prevent substantial contact between the core material and the wall of the interior passageway 106, and to maintain the flow of core material 114 in the central portion of the interior passageway 106.

The manner in which the instant invention helps to prevent carbonization of the core material is best explained with reference to FIG. 4. As discussed above, the core extrudate is preferably made from a vinylidene chloride-vinyl chloride copolymer. Although Saran is favored because of its excellent barrier properties, it is difficult to extrude due to the fact that it is thermally degradable. The amount of thermal degradation of these vinylidene chloride-vinyl chloride copolymers increases at increasing temperatures. Further, the amount of thermal degradation at any one particular temperature will increase as the residence time of the Saran in the extrusion apparatus increases. For example, at normal extrusion temperatures (approximately 185° C.), vinylidene chloride-vinyl chloride copolymers tend to evolve gas in approximately ten minutes. The evolution of gas is generally indicative of the thermal degradation, carbonization, of the Saran. It is desirable to avoid this carbonization.

Merely increasing the velocity of the flow of the core extrudate through the transfer tube 52, feed block 30 and coextrusion die 26 to decrease the average residence time of the core extrudate will not completely eliminate the carbonization of the core extrudate. If the residence time of the slowest moving fraction of the stream of core material is more than the time required to cause thermal degradation, carbonization still takes place. The present invention utilizes a preencapsular material to provide flow characteristics for the core material in transfer tube 52, feed block 30 and coextrusion die 26, which help to ensure that even the slowest moving fraction of the core material moves through the extrusion apparatus 10 sufficiently quickly so that its residence time in transfer tube 52, feed block 30 and coextrusion die 26 is generally less than the residence time necessary to cause thermal degradation.

FIG. 4 illustrates the hypothesized flow characteristics of the preencapsulated core extrudate through transfer tube 52.

A preencapsulated core extrudate can be assumed to be a hypothetical perfectly newtonian core material surrounded by a hypothetical perfectly newtonian preencapsular material. With such a hypothetical preencapsulated core extrudate flowing through a circular cross-section transfer tube 52 having, as an example, a diameter of 0.89 cm, (a radius of 0.445 cm), a length of 28 cm, at a combined average velocity of 128.85 cm/min, one can calculate the velocity of a fraction and residence time of each fraction of the core material and each fraction of the preencapsuar material. Presented below in table 1.1 are calculations for the average velocity and residence time of these hypothetical materials. As will be seen in FIG. 4, fractions A and B are fractions of the hypothetical core material, fractions D, E and F are fractions of the hypothetical preencapsular material, and fraction C represents the fraction traveling at the interface between the core material and preencapsular material. Thus, fraction C represents both the radially outwardmost fraction of the core material, and the radially inwardmost fraction of preencapsular material.

TABLE 1.1

| FRACTION | RADIUS OF FRACTION | VELOCITY OF FRACTION | RESIDENCE TIME |
|---|---|---|---|
| A | 0 | 257.70 | 0.11 |
| B | 0.149 cm | 228.81 | 0.12 |
| C | 0.297 cm | 142.89 | 0.20 |
| D | 0.371 cm | 78.58 | 0.36 |
| E | 0.440 cm | 5.76 | 4.86 |
| F | 0.444 cm | 1.14 | 24.50 |

It should be noted that the above calculations are accurate for only a perfectly laminar flow of a perfect newtonian fluid through a pipe having a perfectly circular cross-section, and therefore do not represent the flow of the preencapsulated core extrudate through transfer tube 52 with complete accuracy. Notwithstanding these deficiencies, the above table is useful in describing the general behavior of the preencapsulated core extrudate as it flows through transfer tube 52.

From the above table, one can make several generalizations regarding the flow of the hypothetical preencapsulated core extrudate which should be applicable to the actual extrudate. For example, the flow of a material, such as core material, through the center of the transfer tube 52 is quicker than the flow of a material, such as preencapsular material, adjacent the walls of the tube. Thus, if one can restrict the flow of a time critical thermally degradable material, such as a Saran barrier material, to the interior portion of transfer tube 52, one can decrease not only the residence time of the thermally degradable core material through transfer tube 52, but can also reduce the residence time of the slowest moving fraction C of the thermally degradable core material in transfer tube 52 to a time less than the time required to thermally degrade the core material. It can also be generalized that by adjusting the relative quantities of the materials flowing through transfer tube 52, one can decrease or increase the radius of the slowest moving fraction C of the thermally degradable core material and thereby increase, or decrease, respectively, the residence time of the slowest moving fraction C of thermally degradable core material in transfer tube 52. It will also be appreciated that if one knows or can approximate the longest amount of time that a particular material can withstand the temperatures within the extrusion apparatus 10, one can adjust the relative quantities of preencapsular material and thermally degradable core material to ensure that the slowest moving fraction C of the thermally degradable core material has a residence time less than the time required to cause this thermal degradation.

However, it should be noted that there is a practical limit to the amount one can increase the volume of preencapsular material relative to the amount of the thermally degradable core material. It has been found by the applicants that if the ratio of preencapsular material to thermally degradable core material is too great, the useable width of the multilayer film 12 extruded through die slot 28 will decrease. The useable width decreaes because the relatively small amount of core material is insufficient to be extruded properly from edge to edge in the multilayer film 12.

The above principles also permit one to make certain generalizations regarding the effect of changing other parameters. For example, as the length of transfer tube 52 increases, the relative ratio of preencapsular material to thermally degradable core material must increase to maintain the same residence time of the slowest moving fraction, C. Conversely, as the length of the transfer tube 52 decreases, the ratio of preencapsular material to thermally degradable core material can be decreased. As the permissible residence time of the material increases (such as by using a core material which can withstand a longer residence time without thermally degrading), the ratio of preencapsular material to thermally degradable core material can be decreased. Likewise, as the permissible residence time decreases, the ratio of preencapsular material to thermally degradable core material can be increased. Further, as the average velocity of the materials through transfer tube 52 increases, the ratio of preencapsular material to thermally degradable core material can be decreased, and as the average velocity decreases, the ratio of preencapsular material to thermally degradable core material can be increased. Also, as the acceptable residence time of most suitable thermally degradable core materials is inversely proportional to their temperature, an increase in the temperature of the thermally degradable core material requires that a greater ratio of preencapsular material to thermally degradable core material be used.

Through experimentation, the applicants have found that, for an extrusion apparatus having a transfer tube 52, feed block 30 and coextrusion die 26 having a combined length of about 30 inches, and having a temperature of approximately 185° C., the preencapsular extrudate should weigh between approximately 7 and 25% of the weight of the core extrudate and preferably between approximately 10 and 15%.

EXAMPLE 1

Figure 2:
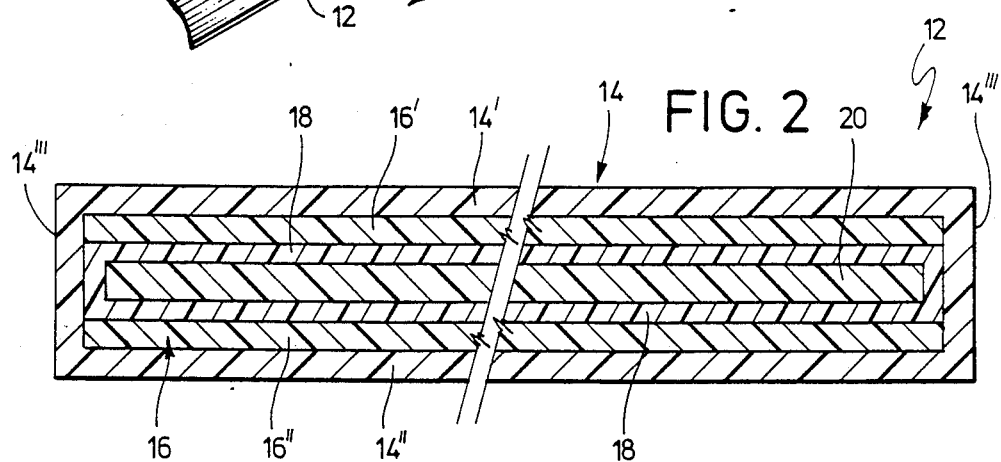
FIG. 2 is an enlarged, sectional view taken along line 2—2 of FIG. 1.

Extrusion apparatus 10 shown in FIGS. 1, 3 and 4 was utilized to produce a film multilayer similar to the multilayer film laminate 12 shown in FIG. 2. A polyethylene resin having a 1.2 melt index and a density of 0.922 grams per cubic centimeter was extruded through outer layer extruder 34 at a rate of 73.5 pounds per hour to form outer layer 14 of multilayer film laminate 12. A copolymer of 77 percent ethylene and 23 percent vinyl acetate having a 5.5 melt index and density of 0.93 grams per cubic centimeter was extruded through the glue extruder 38 at a rate of 12.4 pounds per hour to form glue layer 16.

A blend consisting predominantly of vinylidene chloride-vinyl chloride copolymer was extruded through the core extruder 42. The blend also contained approximately 5 percent of the same ethylene vinyl acetate copolymer used in the glue extruder 38. In the blend 95 percent was a copolymer consisting of 84.2 percent vinylidene chloride, 15 percent vinyl chloride, 0.4 percent magnesium oxide, and 0.4 percent plasticizer available under the trade designation of CITROFLEX A-4 from Unitex Co. of Greensboro, N.C. The specific gravity of the core material was approximately 1.65 grams per cubic centimeter and it was extruded at the rate of 14.1 pounds per hour to form core layer 20. The copolymer used in the preencapsular extruder 46 was the same 77 percent ethylene, 23 percent vinyl acetate copolymer used in glue extruder 38. The preencapsular extrudate was produced by the preencapsular extruder 46 at a rate of 1.9 pounds per hour to form preencapsulation layer 18. From these copolymers, and at these rates, a satisfactory film was produced for several hours with no evidence of thermal degradation.

EXAMPLE 2

The same materials and rates of production that were used in Example 1, were employed in Example 2, except that the preencapsular extruder 46 was slowed to produce the preencapsular extrudate at a rate of 1.5 pounds per hour. Satisfactory film was produced for 35 minutes having no evidence of thermal degradation.

EXAMPLE 3

The same materials and rates that were used for Example 1, were used in Example 3, except that preencapsular extruder 46 was slowed to produce preencapsular extrudate at a rate of 1.0 pounds per hour. It was found that in approximately 10 minutes, the effects of thermal degradation of the core material began to appear.

In conclusion, by utilizing the extrusion apparatus and method of the present invention to preencapsulat a thermally degradable barrier material immediately after the extrusion of the material, thermal degradation of the barrier material in the transfer tube, feed block and extrusion die can be reduced substantially. Having described the invention in detail, and by reference to the preferred embodiments thereof, it will be apparent that modification and variations are possible without the parting from the scope of the invention defined in the appended claims.

What is claimed is:

1. In a process for coextruding a multilayer film having a thermally degradable core material, a method for reducing carbonization of said thermally degradable core material comprising:
   extruding a core extrudate of thermally degradable core material with a core extruder,
   providing a preencapsulation means adjacent the outlet of said core extruder and a transfer tube downstream of said preencapsulated means,
   extruding a preencapsular extrudate of preencapsular material and directing said preencapsular extrudate to said preencapsulation means,
   joining together said core extrudate and said preencapsular extrudate in said preencapsulation means in a coaxial relation wherein said preencapsular extrudate is disposed radially outwardly of said core extrudate to form a preencapsulated core extrudate, and
   directing said preencapsulated core extrudate through said transfer tube to a feed block
   extruding an outer layer extrudate and transferring said outer layer extrudate to said feed block,
   extruding a glue extrudate and transferring said glue extrudate to said feed block,
   joining together in said feed block, said outer layer extrudate, said glue extrudate, and said preencapsulated core extrudate, and
   feeding said joined extrudates through a coextrusion die to form a multilayer film having said outer layer extrudate disposed at the upper and lower surfaces of said multilayer film, said glue extrudate disposed interiorly of said outer layer extrudate, said preencapsular extrudate disposed interiorly of said glue extrudate and said core extrudate disposed interiorly of said glue extrudate.

2. The process of claim 1 wherein said preencapsular extrudate is a polymeric material not generally susceptible to thermal degradation during the extrusion process.

3. The process of claim 2 wherein said thermally degradable core material is a halogenated resin.

4. The process of claim 3 wherein said thermally degradable core material is a vinylidene chloride-vinyl chloride copolymer.

5. The process of claim 4 wherein said preencapsular extrudate is an ethylene vinyl acetate copolymer.

6. The process of claim 2 wherein the step of extruding said preencapsular extrudate comprises extruding said preencapsular extrudate in an amount sufficient so that when said preencapsulated core extrudate is directed through said transfer tube, said preencapsular material will prevent substantial contact between said thermally degradable core material and a wall of said transfer tube.

7. The process of claim 6 wherein the step of extruding said preencapsular extrudate comprises the step of extruding said encapsular extrudate in an amount sufficient so that when said preencapsulated core extrudate is directed through said transfer tube, the radially inner boundary of said preencapsular material is sufficiently distanced from a wall of said transfer tube to permit said thermally degradable core material to travel through said transfer tube in less time than the time necessary to cause any substantial additional carbonization of said thermally degradable core material.

8. The process of claim 7 wherein said step of extruding said preencapsular extrudate further comprises the step of extruding a sufficiently large relative amount of core extrudate to permit said core material to be drawn during the formation of said multilayer film into a layer extending substantially from edge to edge of the multilayer film.

9. The process of claim 1 wherein the steps of extruding said core extrudate and said preencapsular extrudate comprise extruding said core extrudate and preencapsular in amounts such that the weight of preencapsulare extrudate is approximately 7-25% of the weight of the core extrudate.

10. The process of claim 1 wherein said the weight of preencapsular extrudate is approximately 10-15% of the weight of the core extrudate.

11. The process of claim 1 wherein said outer layer extrudate is a polyolefin resin, said glue extrudate is an ethylene vinyl acetate copolymer, said preencapsular extrudate is an ethylene vinyl acetate copolymer, and said core extrudate is a vinylidene chloride-vinyl chloride copolymer.

12. An extrusion apparatus for coextruding a multilayer film from a plurality of feed stock materials comprising:
a core extruder for extuding a core extrudate,
a preencapsulation means disposed adjacent the outlet of said core extruder,
a transfer tube disposed downstream of said preencapsulation means,
a preencapsular extruder for extruding a preencapsular extrudate,
a preencapsular extrudate transfer means for transferring said preencapsular extrudate to said preencapsulation means,
said preencapsulation means including joining means for joining said preencapsular extrudate and said core extrudate in a surrounding relation for travel through said transfer tube,
a coextrusion die,
a feed block for feeding extrudate to said coextrusion die,
an outer layer extruder for extruding an outer layer for said multilayer film and a transfer means for transferring said outer layer extrudate to said feed block, and
a glue extruder for extruding a glue layer for said multilayer film, and a transfer means for transferring said glue extrudate to said feed block.

13. The apparatus of claim 12 wherein said joining means includes a core extrudate pathway, a preencapsular extrudate pathway and a preencapsulated core extrudate pathway, said preencapsulated core extrudate pathway being positioned to receive extrudate from both said core extrudate pathway and said preencapsular extrudate pathway.

14. The apparatus of claim 13 wherein
said core extrudate pathway extends generally axially and includes and upstream end disposed adjacent the outlet of said core extruder, and a downstream end,
said preencapsular extrudate pathway includes an inlet portion for receiving said preencapsular extrudate from said preencapsular extrudate transfer means, a generally radially extending portion and a circumferential outlet portion disposed radially outwardly of and adjacent to said downstream end of said core extrudate pathway, and
said preencapsulated core extrudate pathway is disposed generally coaxially with said core extrudate pathway, and includes an upstream end disposed adjacent to said downstream end of said core extrudate pathway and said outlet portion of said preencapsular extrudate pathway.

15. The appartus of claim 13 wherein said preencapsulated core extrudate pathway has a diameter greater than the diameter of said core extrudate pathway for permitting said preencapsulated core extrudate pathway to receive extrudate from both said core extrudate pathway and said preencapsular extrudate pathway without substantially restricting the flow of said preencapsulated core extrudate.

16. The apparatus of claim 15 wherein said outlet portion of said preencapsular extrudate pathway extends generally axially for directing the flow of preencapsular extrudate in a substantially axial direction to the flow of said core extrudate.

17. The apparatus of claim 12 wherein said transfer tube includes a downstream end disposed adjacent to said feed block for directing said preencapsulated core extrudate into said feed block, and said feed block includes joining means for joining said outer layer extrudate and said glue extrudate to said preencapsulated core extrudate for coextrusion through said coextrusion die to form said multilayer film.

18. The process of claim 11 wherein said glue extrudate is an ethylene vinyl acetate copolymer having a lower vinyl acetate content than the ethylene vinyl acetate copolymer of said preencapsular extrudate.

* * * * *